(12) United States Patent
Matsunuma (10) Patent No.: US 7,584,661 B2
(45) Date of Patent: Sep. 8, 2009

(54) TUNING FORK GYRO SENSOR

(75) Inventor: Shigeo Matsunuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/698,033

(22) Filed: Jan. 26, 2007

(65) Prior Publication Data

US 2009/0120186 A1 May 14, 2009

(30) Foreign Application Priority Data

Sep. 21, 2006 (JP) ............................ 2006-255572

(51) Int. Cl.
G01P 9/04 (2006.01)
H01L 41/08 (2006.01)

(52) U.S. Cl. .................... 73/504.16; 310/370

(58) Field of Classification Search .............. 73/504.16, 73/504.12, 504.04; 310/370
See application file for complete search history.

(56) References Cited

U.S. PATENT DOCUMENTS

| | | | |
|---|---|---|---|
| 4,220,885 A * | 9/1980 | Yamashita et al. .......... 310/321 |
| 5,481,913 A * | 1/1996 | Ito et al. .................. 73/504.16 |
| 5,854,427 A * | 12/1998 | Terada et al. ............. 73/504.16 |
| 6,194,817 B1 | 2/2001 | Yachi et al. |
| 6,250,158 B1 * | 6/2001 | Stewart .................... 73/504.14 |
| 6,366,005 B2 * | 4/2002 | Ishikawa et al. ............ 310/349 |
| 6,647,786 B2 | 11/2003 | Ohta et al. |
| 6,732,586 B2 * | 5/2004 | Nozoe et al. ............. 73/504.12 |
| 6,931,927 B2 | 8/2005 | Ohta et al. |
| 2002/0148290 A1 | 10/2002 | Ohta et al. |
| 2004/0118203 A1 | 6/2004 | Heger |
| 2005/0217376 A1 | 10/2005 | Ohta et al. |

FOREIGN PATENT DOCUMENTS

| | | | |
|---|---|---|---|
| GB | 2171248 | * | 8/1986 |
| JP | 07-038334 | * | 2/1995 |
| JP | 9-269228 | | 10/1997 |
| JP | 11-112268 | * | 4/1999 |
| JP | 2002-310663 | | 10/2002 |
| JP | 2005-321374 | * | 11/2005 |

* cited by examiner

Primary Examiner—Helen C. Kwok
(74) Attorney, Agent, or Firm—Fujitsu Patent Center (57) ABSTRACT

A tuning fork gyro sensor includes a tuning fork vibrator and a casing. The tuning fork vibrator includes a pair of arms that extend parallel, a base that supports the pair of arms, and supporting members that are arranged on both faces of the base such that the supporting members are positioned at the equal distances from both the pair of arms, and that project from the both faces of the base, the both faces being perpendicular to both a direction in which the pair of arms extend and a direction in which the pair of arms are aligned. The casing is hollow to house and support the tuning fork vibrator by supporting the supporting members.

6 Claims, 9 Drawing Sheets

TUNING FORK GYRO SENSOR

BACKGROUND OF THE INVENTION

1. Field of the Invention

The present invention relates to a gyro sensor, specifically to a tuning fork gyro sensor.

2. Description of the Related Art

A tuning fork gyro sensor, which is made by forming a piezoelectric material such as quarts and piezoelectric ceramic, is known as a gyro sensor for detecting angular velocity of an object (see, for example, Japanese Patent Application Publication Nos. H09-269228 and 2002-310663). The tuning fork gyro sensor utilizes that when arms of its tuning fork are rotated while the arms are vibrated in a predetermined direction (a primary vibration), a secondary vibration occurs in a direction perpendicular to a direction of the primary vibration by Coriolis force.

Figure 6:
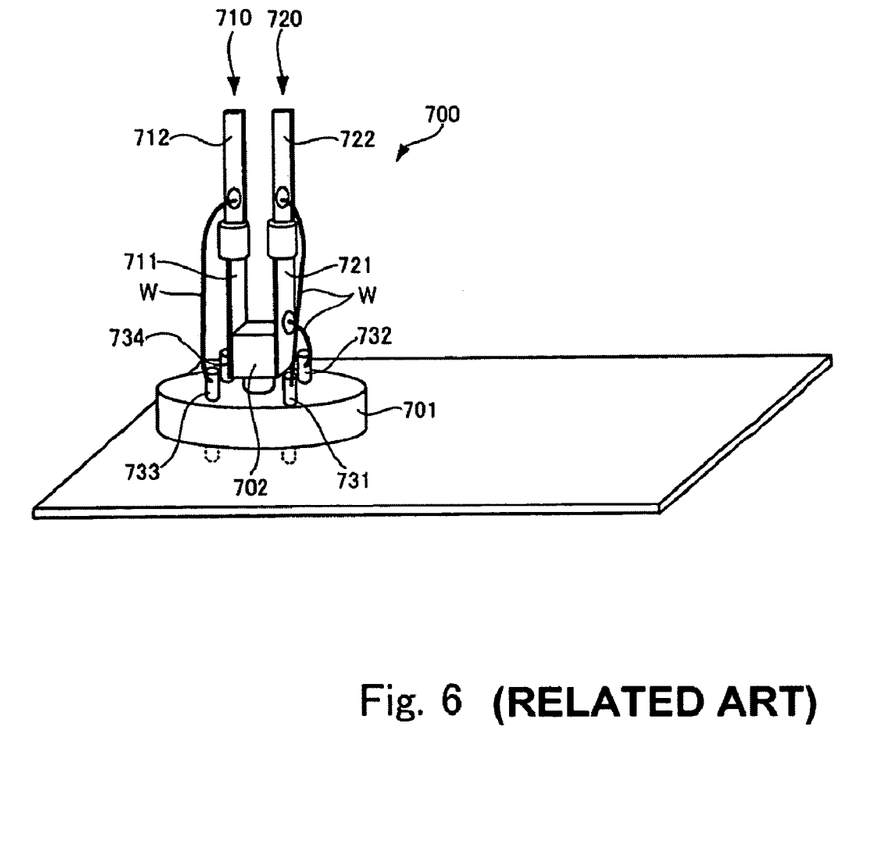
FIG. 6 is a diagram showing an external appearance of a conventional tuning fork gyro sensor.
Figure 7:
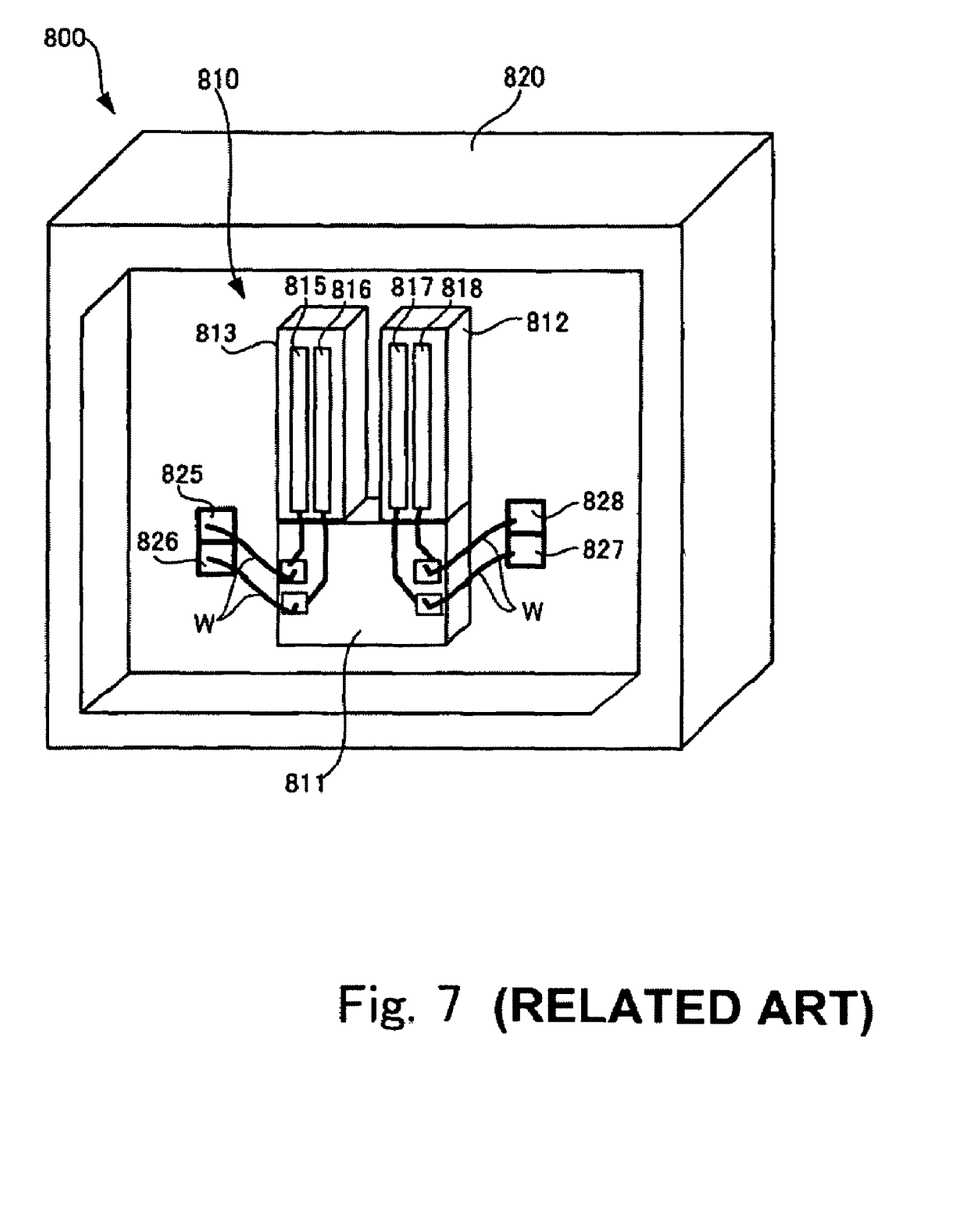
FIG. 7 is a diagram showing an external appearance of another conventional tuning fork gyro sensor.

FIGS. 6 and 7 are diagrams each showing an appearance of a conventional tuning fork gyro sensor.

A conventional tuning fork gyro sensor 700 shown in FIG. 6 has a configuration that a base 702 is supported on a pedestal 701 and two arms 710 and 720 extend upward from both ends of the base 702. The arms 710 and 720 are made of a piezoelectric material and have top arms 712 and 722, and bottom arms 711 and 721 respectively. The bottom arms 711 and 721 are arranged opposite to each other and attached on the base 702, and the top arms 712 and 722 are arranged with 90 degree rotated with respect to the bottom arms 711 and 721. The top arms 712 and 72 and the bottom arms 711 and 721 are provided with electrodes on each surface and are connected to terminals 731 through 734 arranged on the base 701 with electric wires W. When a driving voltage is applied for a predetermined period to the bottom arms 711 and 721 through terminals 732 and 734, two arms 710 and 720 vibrate in the directions opposite to each other (primary vibration). A secondary vibration produced by a rotation of the tuning fork gyro sensor 700 is a vibration in a direction perpendicular to that of the primary vibration. A secondary vibration is detected from the terminals 731 and 733 as a voltage produced at the top arms 712 and 722.

Another conventional tuning fork gyro sensor 800 shown in FIG. 7 is composed of a tuning fork vibrator 810 and a casing 820. The tuning fork gyro sensor 810 includes a base 811 supported by a casing 820 and two arms 812 and 813 supported by the base 811. Electrodes 815, 816, 817 and 818, which are arranged on surfaces of the 812 and 813, are electrically connected to terminals 825, 826, 827 and 828 via electric wires W respectively. When a driving voltage is applied to the arms 812 and 813 through the terminals 825 and 828, the arms 812 and 813 vibrate (the primary vibration). A secondary vibration produced by a rotation of the tuning fork gyro sensor 800 is detected by the terminals 826 and 827 as a voltage.

Figure 8:
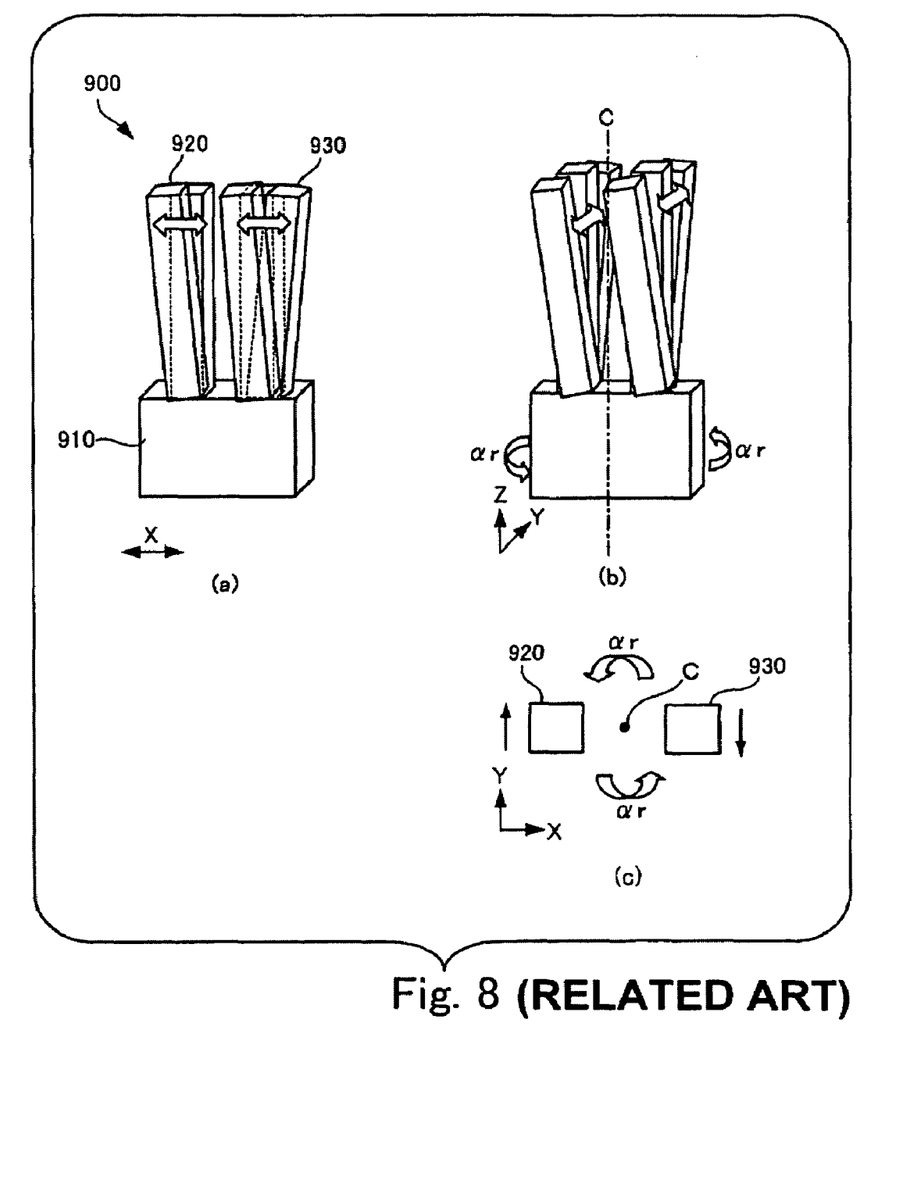
FIG. 8 is a diagram for describing a vibration of a tuning fork vibrator.
Figure 9:
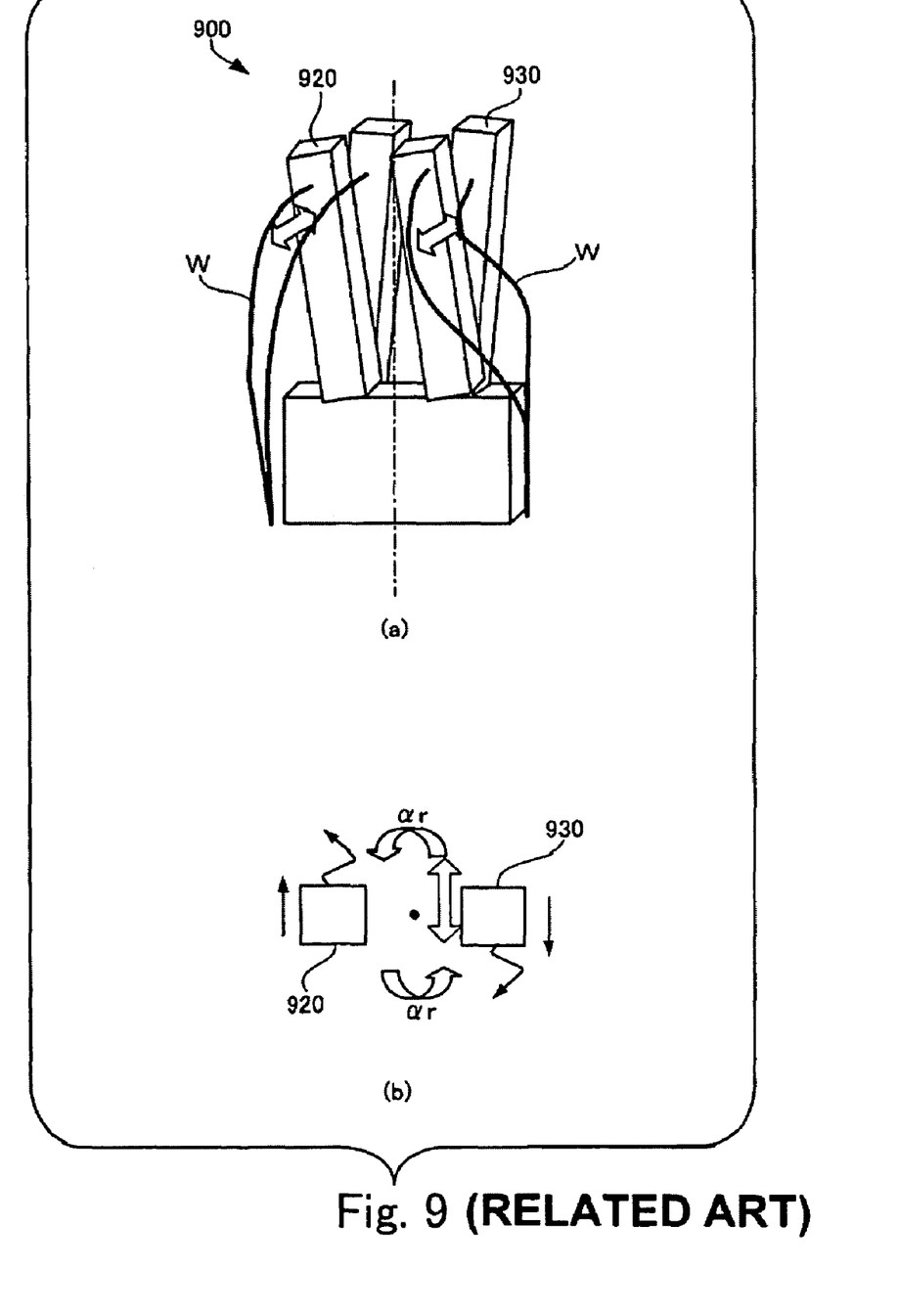
FIG. 9 is a diagram for describing a vibration of a tuning fork vibrator.

FIGS. 8 and 9 are diagrams for describing a vibration of a tuning fork vibrator.

A tuning fork vibrator 900 schematically shown in FIG. 8 is composed of a pair of arms 920 and 930 extending parallel and a base 910 supporting the arms 920 and 930. As shown in part (a) of FIG. 8, the arms 920 and 930 vibrate periodically in directions opposite to each other that is a direction X where the arms 920 and 930 face each other. When the tuning fork gyro sensor 900 receives an angular velocity α r to generate a secondary vibration, the arms 920 and 930 vibrate in a secondary vibration direction Y perpendicular to both a direction Z where the arms 920 and 930 extend and the facing direction X as shown in part (b) and part (c) of FIG. 8.

In the tuning fork vibrator 900 shown in FIG. 8, when the secondary vibration is produced in the tuning fork gyro sensor, a rotation motion (or a twist motion) is produced around a centerline C which is supposed to extend in the center between the arms 920 and 930 in the direction where the arms 920 and 930 extend. In addition, in the primary vibration, the arms 920 and 930 vibrate plane symmetrically with respect to an imaginary plane that is formed at the equal distances from both the arms 920 and 930 and includes the centerline C. Accordingly, in both the primary and secondary vibrations, the tune fork vibrator 900 has a minimum vibration at a position of the base 910 where the centerline C goes through. In addition, for detecting precisely the angular velocity through the secondary vibration, it is desirable that a mechanical structure of the tuning fork vibrator 900 including a supporting structure for the tuning fork vibrator 900 is symmetrical with respect to the centerline C which is a center of the rotation motion and serves as an axis of symmetry.

However, in the conventional tuning fork gyro sensor 800 shown in the FIG. 7, the base 811 is supported by a bottom portion of the casing 820, so that distribution balance of a secondary vibration tends to be disordered.

In the conventional tuning fork gyro sensor 700 shown in FIG. 6, the top arms 712 and 722 and bottom arms 711 and 721 are connected to the electric wires W. In FIG. 9 the tuning fork vibrator 900 schematically shown in FIG. 8 is shown including the electric wires W. In the tuning fork vibrator 900 shown in FIG. 9, vibration characteristics of the arms 920 and 930 change and an irregular translational motion occurs, and thereby deteriorating an accuracy for detecting angular velocity.

SUMMARY OF THE INVENTION

In the view of foregoing, the present invention has been made in the view described above and provides a tuning fork gyro sensor having an improved accuracy for detecting angular velocity.

A tuning fork gyro sensor according to the invention includes a tuning fork vibrator a casing. The tuning fork vibrator includes a pair of arms that extend parallel, a base that supports the pair of arms, and supporting members that are arranged on both faces of the base such that the supporting members are positioned at the equal distances from both the pair of arms, and that project from the both faces of the base, the both faces being perpendicular to in both a direction in which the pair of arms extend and a direction in which the pair of arms are aligned. The casing is hollow to house and support the tuning fork vibrator by supporting the supporting members.

In the tuning fork gyro sensor according to the invention, the supporting members are arranged at positions which are on the both faces of the base and are near a centerline which extends to go through the base in a direction in which the pair arms extend. Accordingly, displacement magnitudes of both the primary vibration and secondary vibration are minimum. In addition, because the tuning fork vibrator is supported by the supporting members projecting from the both faces of the base and the tuning fork vibrator including the supporting members has a symmetrical structure, imbalance vibrations according to an asymmetrical structure can be suppressed. Therefore, the secondary vibration reflects rotation angular velocity accurately, and thereby an accuracy of the tuning fork gyro sensor for detecting angular velocity is improved.

In the tuning fork gyro sensor according to the invention, it is preferable that the casing includes a cross section having a symmetrical form with respect to a symmetrical axis of a centerline which extends in a direction where the pair of arms extend.

Accordingly, because the tuning fork gyro sensor including the casing has a symmetrical structure with respect to the centerline described above, the accuracy for detecting angular velocity can be more improved.

In the tuning fork gyro sensor according to the invention, it is preferable that the tuning fork vibrator includes at least one arm electrode on a surface of each of the pair of arms, the supporting member is a conductor that is electrically connected to the arm electrode, and the casing includes connecting electrodes supported by the supporting member on an inner wall of the casing supporting the supporting member.

Supporting bumps for mechanically supporting the tuning fork vibrator are also used for electrically connecting to the arm electrodes, and thereby there is no need to connect electrical wires to the arm electrodes. Therefore, influences to vibration characteristics of the arms and irregular translational motions are suppressed. Accordingly, the detecting characteristics of the tuning fork gyro sensor is further improved.

In addition, in the tuning fork gyro sensor according to the invention, it is preferable that the supporting members are of the same length.

Further, in the tuning fork gyro sensor according to the invention, it is desirable that the casing has a cross section having a symmetrical form with respect to a symmetrical axis of a centerline which extends in a direction where the pair of arms extend.

As described above, according to the invention, a tuning fork gyro sensor having an improved accuracy of detecting angular velocity can be realized.

DETAILED DESCRIPTION OF THE INVENTION

An exemplary embodiment of the tuning fork gyro sensor according to the invention will be described with reference to the attached drawings.

Figure 1:
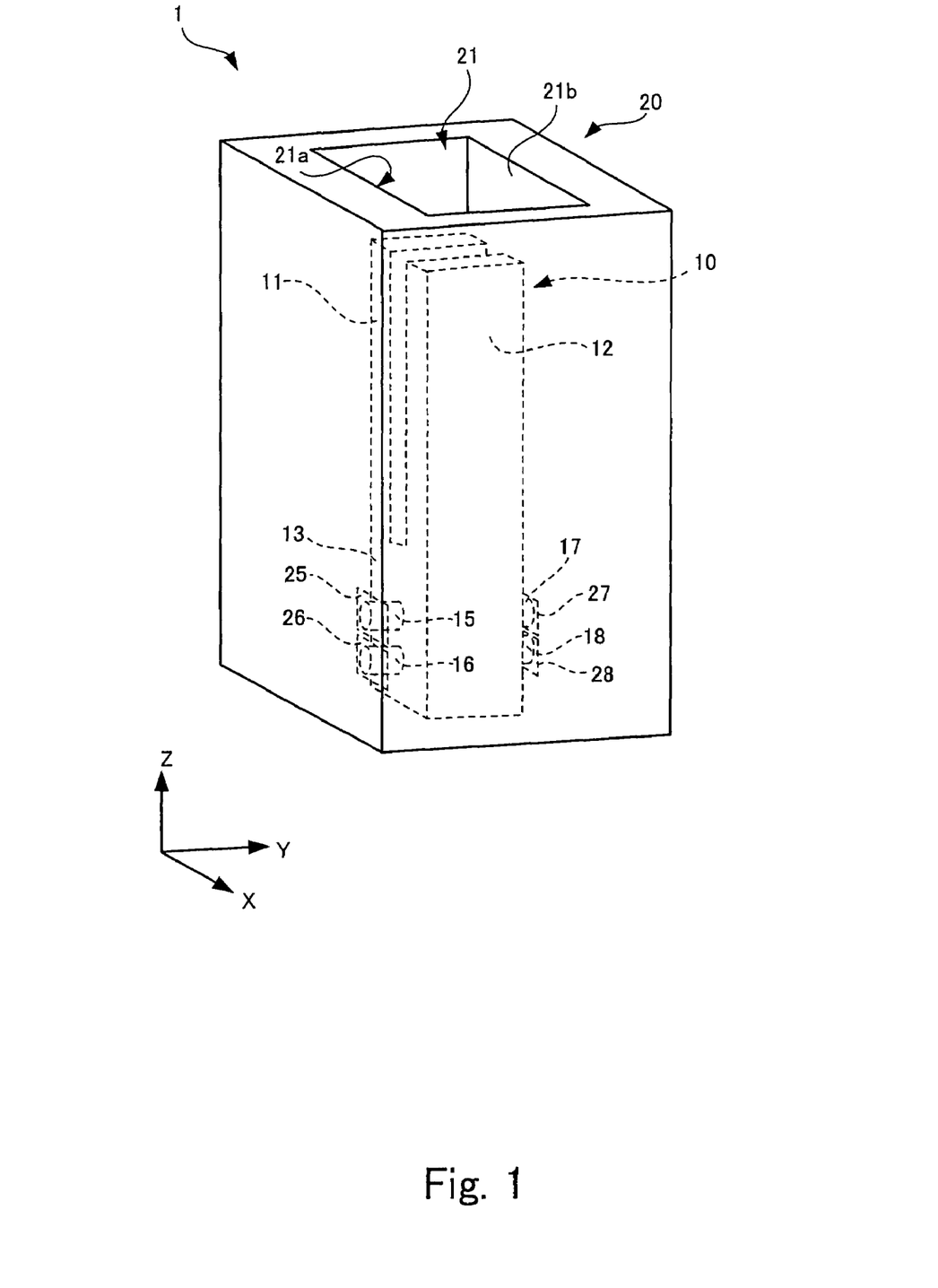
FIG. 1 is perspective diagram showing a structure of a gyro sensor as an exemplary embodiment of the tuning fork gyro sensor according to the invention.
Figure 2:
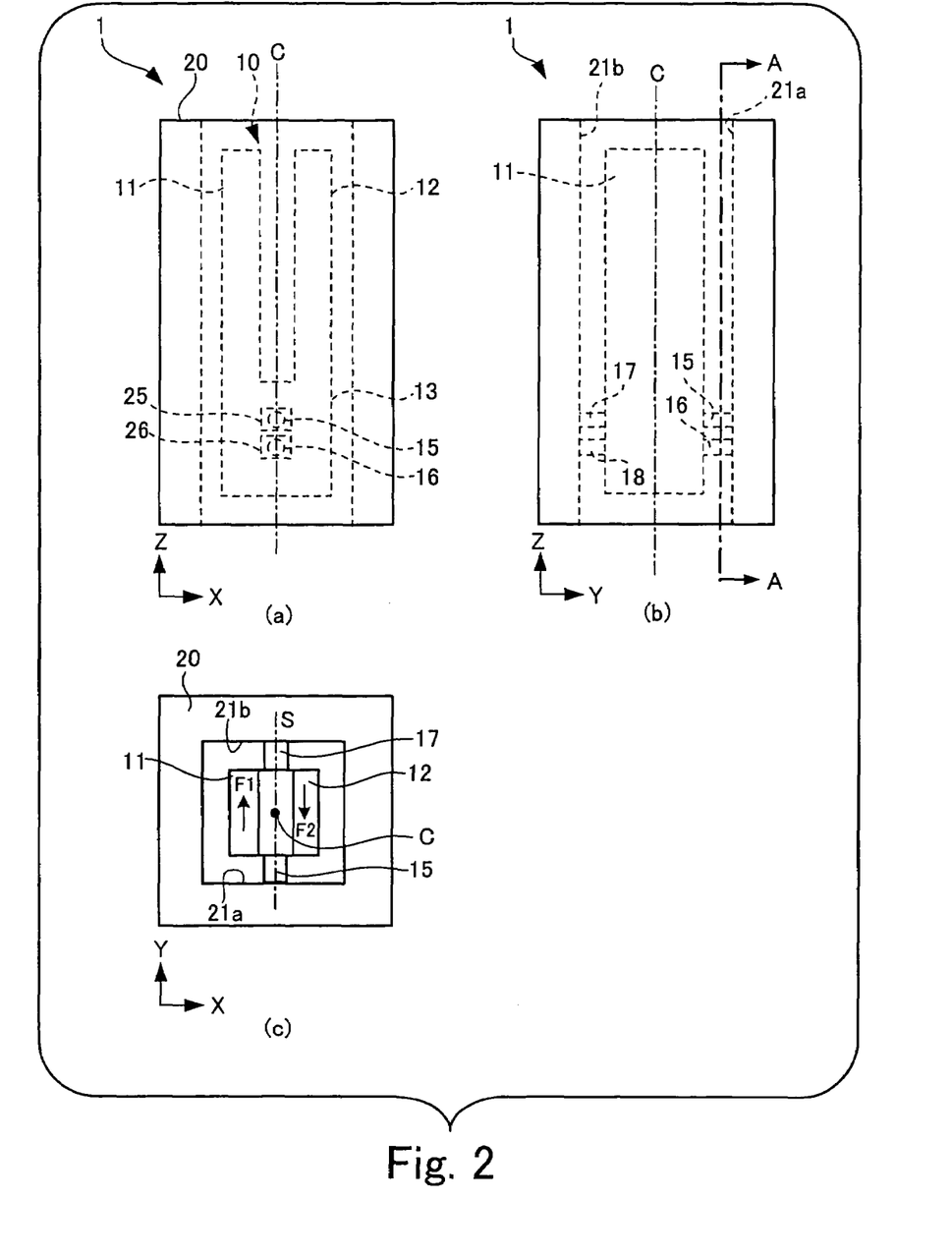
FIG. 2 is a projected plan showing a structure of the gyro sensor.

FIGS. 1 and 2 are diagrams showing a structure of a gyro, sensor as the embodiment of the tuning fork gyro sensor according to the invention. An internal structure of the gyro sensor is seen through in FIGS. 1 and 2. FIG. 1 is a perspective diagram of the gyro sensor, and FIG. 2 is a projection view of the gyro sensor. Parts (a), (b) and (c) of FIG. 2 are a front view, a right side view and a plan view of the gyro sensor respectively.

The gyro sensor 1 shown in FIGS. 1 and 2 includes a vibrator 10 and a casing 20 housing the vibrator 10.

The vibrator 10 has a tuning fork shape, and includes a pair of arms 11 and 12 extending almost parallel and a base 13 supporting the arms 11 and 12. The arms 11 and 12 and the base are formed in one piece. The vibrator 10 is made of a piezoelectric ceramic and may be also made of other piezoelectric materials such as quartz. The vibrator 10 corresponds to an example of the tuning fork vibrator according to the invention. Hereinafter, the description will be continued in a supposition that a direction where the arms 11 and 12 extend from the base 13 is defined as an upward direction, a direction opposite to the upward direction is defined as a downward direction, and the direction where the arms 11 and 12 extend from the base 13 is defined as an up-and-down direction Z, a direction where the arms 11 and 12 are aligned is defined as a right-and-left direction X, and a direction perpendicular to both the up-and-down direction Z and the right-and-left direction is defined as a font-and-back direction Y.

The base 13 of the vibrator 10 is provided with four bumps 15, 16, 17 and 18. The bumps 15 through 18 are cylindrical members having same length and are made of same electro conductive material. Each two bumps of the four bumps 15 through 18 are provided on both sides of the base 13 in the front-and-back direction of the base 13. The bumps 15 through 18 are, as shown in parts (a) and (b) of FIG. 2, arranged at the equal distances from the two arms 11 and 12, and project from the base 13 in the front-and-back direction Y. In the embodiment, the bumps 15 through 18 are made of gold, however the bumps 15 through 18 may be also made of other materials such as another metal and electro conductive resin. Each of the bumps 15 through 18 corresponds to an example of the supporting member according to the invention.

The casing 20 is a hollow member made of a ceramic having an external appearance of a rectangular shape. A housing room 21 for housing the vibrator 10 is formed in the casing 20. The housing room 21 is a square pole shape cavity which expands in a center portion of the housing 20 from one face to the opposing face in the up-and-down direction in the drawings. Of four internal walls forming the hosing room 21, a pair of the walls facing each other are supporting the bumps 15 through 18 of the vibrator 10 as supporting faces 21a and 21b.

Here, referring to FIG. 3, the supporting faces 21a and 21b of the casing 20 will be described.

Figure 3:
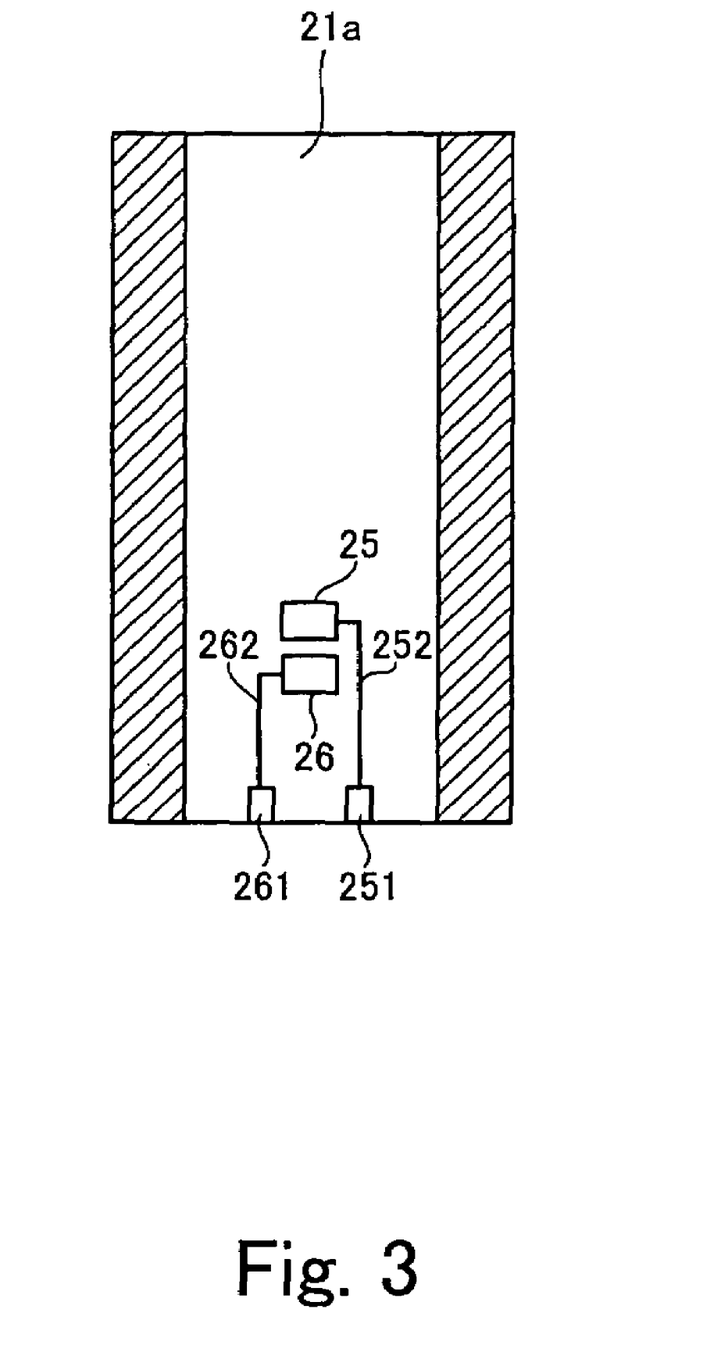
FIG. 3 is a cross section along an A-A line shown in FIG. 2.

FIG. 3 is a cross section along A-A line shown in FIG. 2. FIG. 3 illustrates the cross section of the supporting face 21a of the casing 20 viewed from the hosing room 21 side.

Two connecting electrodes 25 and 26 made of a metal are arranged on the supporting face 21a of the housing 20. Two terminals 251 and 161 are arranged for connecting an external driving circuit and an external detecting circuit at a lower end of the supporting face 21a. The terminals 251 and 261 are electrically connected to the electrodes respectively by wiring patterns 252 and 262 formed on the supporting face 21a. Other two connecting electrodes 27 and 28 are arranged on the supporting face 21b opposite to the supporting face 21a in FIG. 3. However, since connecting electrodes 27 and 28 have a structure similar to that shown in FIG. 3, a detail description will be omitted.

Returning to FIGS. 1 and 2, the description will be continued. Of the four bumps 15 through 18, the bumps 15 and 16 are connected to the connecting electrodes 25 and 26 formed on the supporting face 21a by using an adhesive made of an electro conductive material respectively. The other two bumps 17 and 18 are glued and electrically connected to the connecting electrodes 27 and 28 formed on the supporting face 21b respectively.

Next, the vibrator 10 will be described in detail.

Figure 4:
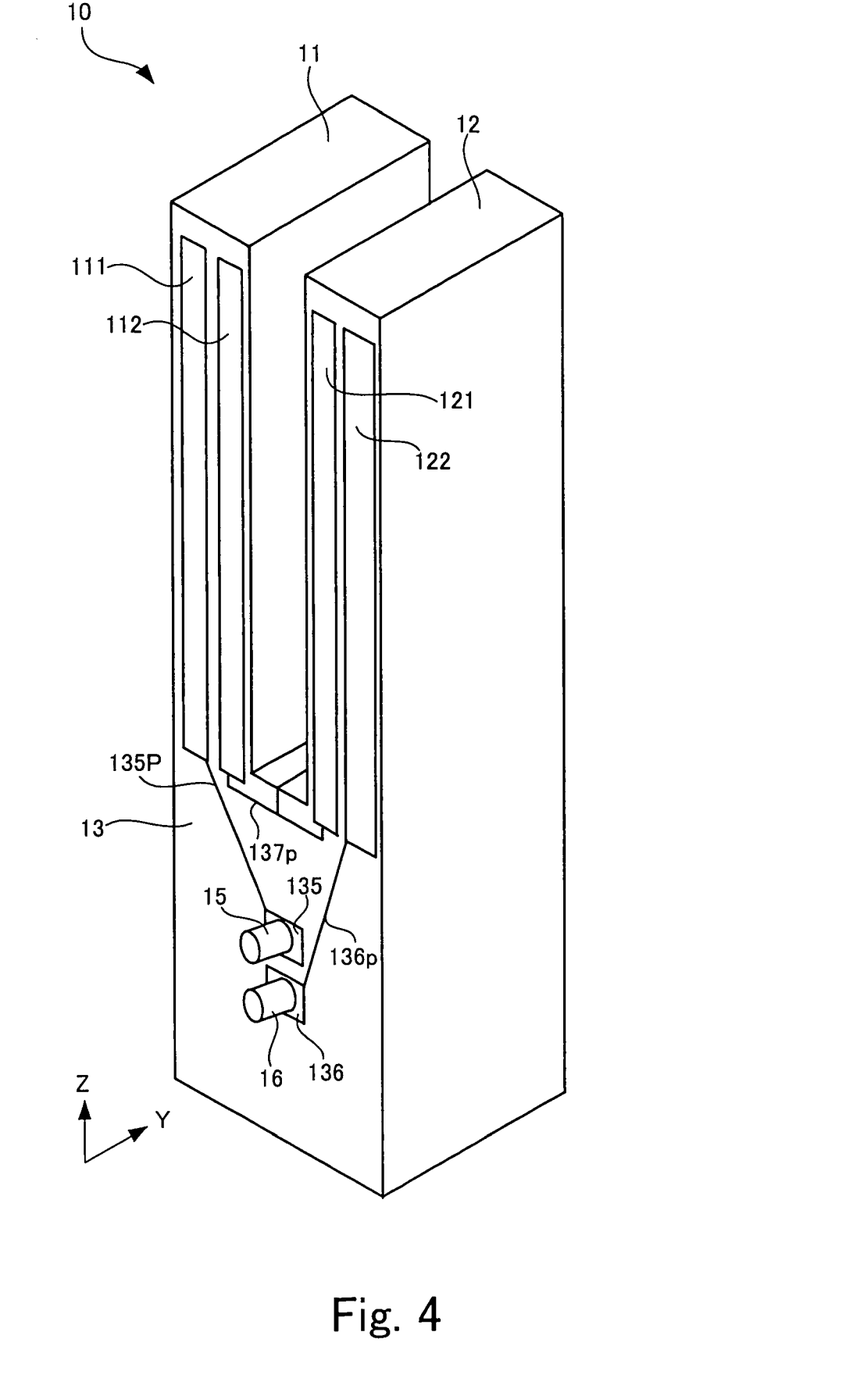
FIG. 4 is a perspective diagram showing an external appearance of a vibrator arranged in the gyro sensor shown in FIG. 1.

FIG. 4 is a perspective diagram showing an external appearance of the vibrator 10 arranged in the gyro sensor 1 shown in FIG. 1.

The arm 11 of the vibrator 10 is provided with four arm electrodes 111, 112, 113 and 114 two each on the both faces in the front-and-back direction Y. Of four of the arm electrodes, only two of the arm electrodes 111 and 112 appear in FIG. 4. The arm electrodes 111 and 112 are arranged parallel and extend in the up-and-down direction Z. This arrangement is also applied to the other electrodes 113 and 114 (not shown in FIG. 4, see FIG. 4) on the opposite face of the arm 11. Further, the arm 12 of the vibrator 10 is provided with four arm electrodes 121, 122, 123 and 124 two each on both faces of the arm 12 in the front-and-back direction Y. The vibrator 10 includes totally eight of the electrodes 111 through 114 and 121 through 124.

The base 13 of the vibrator 10 is provided with four bump electrodes 135, 136, 137 and 138 two each on both faces of the base 13 in the front-and-back direction. Of four of the bump electrodes, only two of the bump electrodes 135 and 136 appear in FIG. 4. The bump electrodes 135 and 136 are arranged in a position at the equal distances from both of the arms 11 and 12. In the same manner, the other bump electrodes 137 and 138 (see part (a) of FIG. 5), which are not shown in FIG. 4, are also arranged in a position at the equal distances from both of the arms 11 and 12. The bumps 15 and 16 are glued by an adhesive made of an electro conductive material and is electrically connected to the bump electrodes 135 and 136 respectively. The bumps 17 and 18, which are not shown in FIG. 4 (see FIG. 1), are also electrically connected to the bump electrodes 137 and 138 respectively. Four of the bump electrodes 135 through 138 are electrically connected to the arm electrodes 11 through 114 and 121 through 124 by wiring patterns 135p, 136p, 137p and 138p. Of the wiring patterns 135p through 138p, only three of the wiring patterns 135p, 136p and 137p are shown in FIG. 4.

As described above, the bumps 15 through 18 are electrically connected to the connecting electrodes 25 through 28 arranged on the supporting faces 21a and 21b. Therefore, the arm electrodes 111 through 114 and 121 through 124 are electrically connected to terminals including the terminals 251 and 261 (see FIG. 3) arranged on edges of the casing 20, through the wiring patterns 135p through 138p, the bump electrodes 135 through 138, the bumps 15 through 18 (see FIG. 1), the connecting electrodes 25 trough 28 of the casing 20 (see FIG. 1) and the wiring patterns 252 and 262 of the casing 20 (see FIG. 3).

Figure 5:
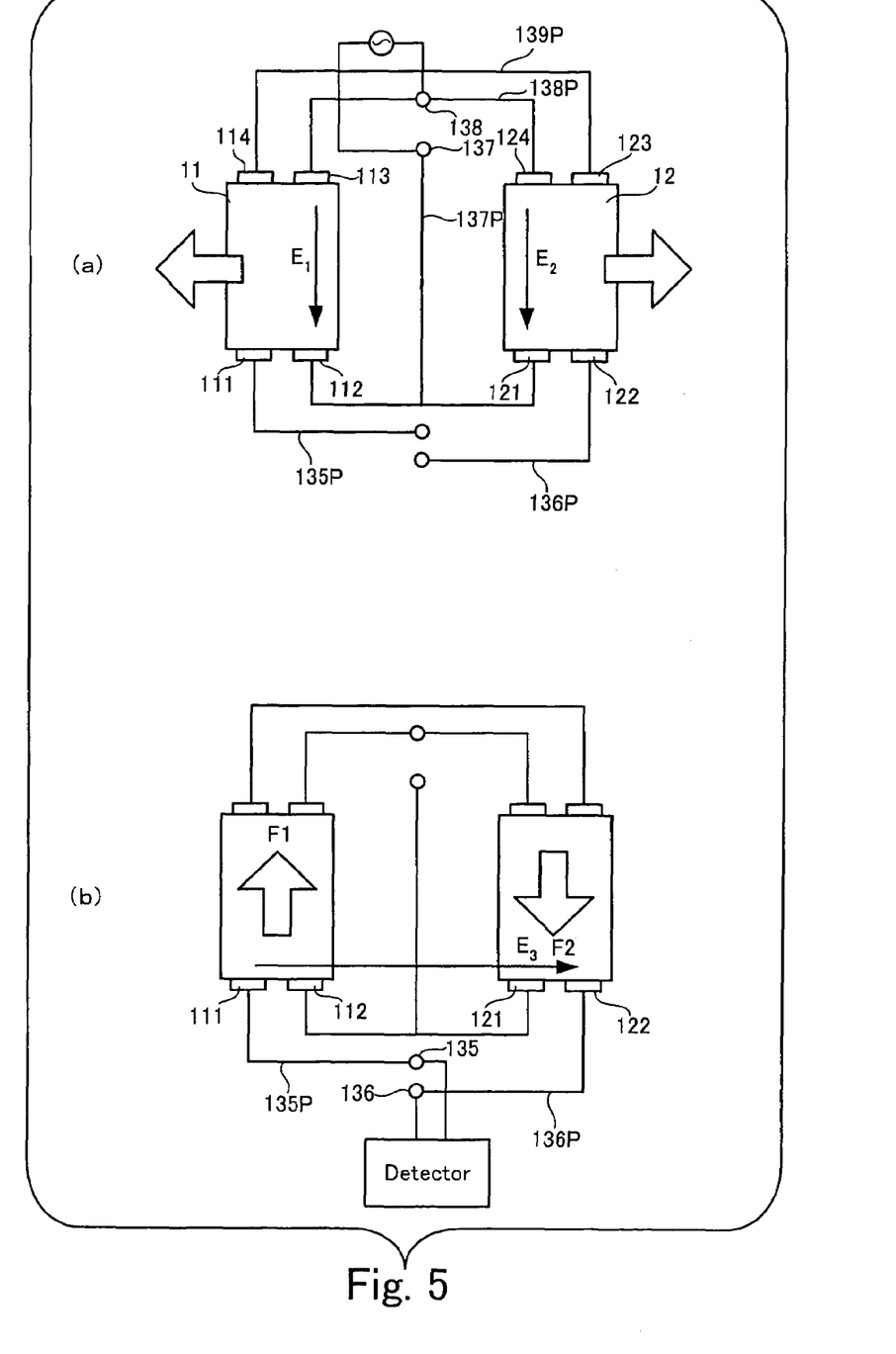
FIG. 5 is a diagram showing electrical connections of arm electrodes and connecting electrodes shown in FIG. 4.

FIG. 5 is a diagram showing electrical connections of arm electrodes and connecting electrodes shown in FIG. 4. Parts (a) and (b) of FIG. 5 are diagrams showing respectively an excitation mode and a detecting mode. The excitation mode of exciting the arms 11 and 12 in a primary vibration and the detecting mode of detecting a secondary vibration generated in the arms 11 and 12 in the same electrical connection are shown in Parts (a) and (b) of FIG. 5 respectively, and separately shown for convenience of description.

In the excitation mode shown in part (a) of FIG. 5, an exciting voltage having a period corresponding to a resonant vibration period of the arms 11 and 12 is applied to the bump electrodes 137 and 138 through the bumps 17 and 18 (see FIG. 1) from the terminals of the casing 20. The exciting voltage applied to the bump electrodes 137 and 138 is provided between the arm electrodes 113 and 112 of the arm 11 to generate an electric field E1 and is simultaneously provided between the arm electrodes 124 and 121 of the arm 12 to generate an electric field E2. As a result, the arms 11 and 12 vibrate in the right-and-left direction X in which the arms 11 and 12 are aligned. When the gyro sensor 1 is rotated to receive angular velocity, secondary vibrations in directions opposite to each other are generated by Coriolis effect in front-and-back direction Y in the arms 11 and 12 respectively. The secondary vibration of the arms 11 and 12 generates a voltage between the arm electrodes 111 and 122. This voltage is detected by the terminals 251 and 261 of the casing 20 through the connecting terminals 135 and 136 and bumps 15 and 16 to obtain angular velocity received by a detector.

Here, returning to FIG. 2, the description about the gyro sensor structure will be continued.

On the supposition of the centerline C stretching in the center between the pair of arms 11 and 12 in the up-and-down direction where the pair of arms 11 and 12 extend as shown in part (c) of FIG. 2, because in the secondary vibration, the arms 11 and 12 vibrate in the directions opposite to each other in the front-and-back direction Y, a twist motion with the centerline C centered is generated with the vibrator 10. Accordingly, displacement magnitude in the secondary vibration mode becomes smaller towards the centerline C of the vibrator 10 in the base 13. In addition, in the primary vibration mode, the arms 11 and 12 vibrate plane symmetrically with respect to symmetry plane S that is formed at the equal distances from both the arms 11 and 12 and includes the centerline C. Accordingly, displacement magnitude in the primary vibration becomes smaller towards the symmetry plane S including the centerline C. In the gyro sensor 1 according to the embodiment, the bumps 15 through 18 are provided in same distances from both the pair of arms 11 and 12 on the base 13. These positions where the bumps 15 through 18 are provided are positions near the centerline C and included in the symmetry plane S. Thus, the vibrator 10 is supported by the bumps 15 through 18 in a position where the displacement magnitudes of both primary vibration and secondary vibration become minimum, thereby suppressing effects to the vibration of the vibrator 10. Furthermore, the vibrator 10 is supported by the bumps 15 through 18 projecting from both sides of the vibrator 10 in the front-and-back direction Y, and has a symmetrical structure including the bumps 15 through18 with respect to the centerline C as a symmetry axis. Therefore, redundant vibrations due to an asymmetrical structure can be suppressed.

The bumps 15 through 18 have same length, thereby providing a highly symmetrical structure with respect to the centerline C as symmetry axis.

In addition, the casing 20 also has a structure with a symmetrical cross section with respect to the centerline C as symmetry axis. The gyro sensor 1 including the casing 20 has a symmetrical structure with respect to the centerline C as symmetry axis. Therefore, redundant vibrations due to an asymmetrical structure can be further suppressed.

The bumps 15 through 18 support the vibrator 10 and simultaneously provide connections for connecting the arm electrodes 111 through 114 and 121 and 124. Accordingly, there is no need to provide electrical wires for directly connecting the arms 11 and 12, and it is possible to prevnet redundant effects by those electrical wires to the vibration.

In the embodiment described above, four bumps for supporting the vibrator 10 are exemplified. However, the number of the supporting members according to the invention is not limited so, and may be two or more.

In addition, in the embodiment described above, the casing is described as having a rectangular shape and as a hollow member formed with the housing room 21 with square pole shape. However, the casing according to the invention is not limited so, and may be any prism with a number of corners other than four or a cylinder. The casing according to the invention may have a shape with the bottom closed or all the faces closed, or may be a box with all faces closed, as far as a hollow member.

Furthermore, in the embodiment described above, the arm electrode arrangements on the arms and the electrical connections to the electrodes are explained but are not limited to so. For example, the number of the arm electrodes may be other than eight, or the arm electrodes may be arranged on the right-and-left faces.

What is claimed is:

1. A tuning fork gyro sensor comprising:
   a tuning fork vibrator including:
   a pair of arms that extend parallel;
   at least one arm electrode on a surface of each of the pair of arms;
   a base that supports the pair of arms; and
   supporting members that are arranged on both faces of the base such that the supporting members are positioned at the equal distances from both the pair of arms, and that project from the both faces of the base, the both faces being in a perpendicular direction to both a direction in which the pair of arms extend and a direction in which the pair of arms are aligned, and that are conductors which are electrically connected to the at least one arm electrode; and
   a casing that is hollow to house and support the tuning fork vibrator by supporting the supporting members, and that includes connecting electrodes connected with the supporting members on an inner wall of the casing supporting the supporting members.

2. The tuning fork gyro sensor according to claim 1, wherein the supporting members are arranged as a group of two on each of the both faces of the base, and the two supporting members arranged on each of the both faces are arranged such that each of the two supporting members on one of the both faces overlap respectively each of the two supporting members on other one of the both faces in the perpendicular direction.

3. A tuning fork gyro sensor comprising:
   a tuning fork vibrator including:
   a pair of arms that extend parallel;
   a base that supports the pair of arms; and
   supporting members that are arranged on both faces of the base such that the supporting members are positioned at the equal distances from both the pair of arms, and that project from the both faces of the base, the both faces being perpendicular to in both a direction in which the pair of arms extend and a direction in which the pair of arms are aligned; and
   a casing that is hollow to house and support the tuning fork vibrator by supporting the supporting members,
   wherein the supporting members are electrodes and are individually supported by a pair of inner walls of the casing which inner walls are opposed each other.

4. The tuning fork gyro sensor according to claim 3, wherein the supporting members are of the same length.

5. The tuning fork gyro sensor according to claim 3, wherein the pair of inner walls include electrodes.

6. The tuning fork gyro sensor according to claim 3, wherein the pair of inner walls are electrodes.

\* \* \* \* \*